(12) United States Patent
Kawanabe et al.

(10) Patent No.: US 7,800,784 B2
(45) Date of Patent: Sep. 21, 2010

(54) IMAGE PRINTING APPARATUS, IMAGE PRINTING SYSTEM AND CONTROL METHOD

(75) Inventors: Tetsuya Kawanabe, Kanagawa (JP); Takao Aichi, Tokyo (JP); Akihiko Hamamoto, Kanagawa (JP); Kazuyuki Masumoto, Kanagawa (JP); Fumihiro Goto, Kanagawa (JP); Makoto Hibi, Kanagawa (JP); Tetsuya Suwa, Kanagawa (JP); Mitsuhiro Ono, Tokyo (JP); Masato Oshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/797,228

(22) Filed: May 2, 2007

(65) Prior Publication Data
US 2007/0201095 A1      Aug. 30, 2007

Related U.S. Application Data

(62) Division of application No. 10/368,588, filed on Feb. 20, 2003, now Pat. No. 7,277,198.

(30) Foreign Application Priority Data
Feb. 22, 2002    (JP)    ............................. 2002-046683

(51) Int. Cl.
*H04N 1/40*    (2006.01)

(52) U.S. Cl. ......................................... 358/2.1; 358/468

(58) Field of Classification Search ................. 358/1.9, 358/2.1, 426.02, 436, 468; 382/276
See application file for complete search history.

(56) References Cited

U.S. PATENT DOCUMENTS

| 5,946,457 A | 8/1999 | Nakai et al. ................ 358/1.13 |
| 6,836,565 B1 | 12/2004 | Nishikawa ................... 382/167 |
| 6,937,356 B1 | 8/2005 | Ito et al. .................... 358/1.16 |
| 6,967,370 B2 | 11/2005 | Schroder et al. ............ 257/296 |
| 2003/0164983 A1 | 9/2003 | Yamada et al. ............. 358/3.06 |
| 2005/0102518 A1 * | 5/2005 | Wada .......................... 713/168 |

FOREIGN PATENT DOCUMENTS

| JP | 11-78131 | 3/1999 |
| JP | 2000-137806 | 5/2000 |
| JP | 2000-165647 | 6/2000 |
| JP | 2001-285617 | 10/2001 |

\* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

An image printing apparatus and its control method for printing an image based on image data from an image data source. In a case where a correction condition is set for the image data, if the image data is a new format file image data including predetermined information, correction processing is performed in accordance with the set correction condition. If the image data is not a new format file image data, the correction processing in accordance with the correction condition is not performed.

19 Claims, 20 Drawing Sheets

IMAGE PRINTING APPARATUS, IMAGE PRINTING SYSTEM AND CONTROL METHOD

This application is a divisional application of co-pending application Ser. No. 10/368,588, filed Feb. 20, 2003, which is incorporated herein by reference.

FIELD OF THE INVENTION

The present invention relates to image printing apparatus, image printing system and control method for inputting image data from an image supply device such as a digital camera or a memory and printing an image on a print medium.

BACKGROUND OF THE INVENTION

As an image printing apparatus which inputs image data from an image supply device such as a digital camera or a memory and prints an image on a print medium, an apparatus having an image correction function is known. In this image printing apparatus, when a desired image is printed, setting is made such that image correction is performed on the image data for the entire one print designation operation (one print job) or such that image correction is not performed at all.

Accordingly, when plural images are to be printed by using this image printing apparatus, correction is performed on all the image data, or correction is not performed. However, input image data may include new-format image data which is subjected to optimized correction, if setting of image correction is on, in accordance with its information, and conventional format image data without such setting function. For example, in a case where plural (e.g. 3) images to be printed, it is desirable that regarding an image A represented by new format image data, the image correction setting is turned ON; regarding an image B represented by conventional format image data, the image correction setting is turned OFF; and regarding an image C represented by the new format image data, the image correction setting is turned ON. In such case, the following operation is necessary. The images A, B and C are respectively printed by different processings (3 print jobs). That is, the image correction setting is turned ON and the image A is printed, then the image correction setting is turned OFF and the image B is printed, and the image correction setting is turned ON and the image C is printed. Otherwise, the images A and C are printed with the same setting, and the image B is printed with another setting (by 2 print jobs). In any case, printing for these plural types of images is troublesome, and if the types and the number of print sheets increase, the operation for printing becomes more complicated.

SUMMARY OF THE INVENTION

The present invention has been made in consideration of the above conventional art, and has its object to provide image printing apparatus, image printing system and control method for determining, by image data, whether or not image data includes predetermined information and if set image correction condition is a predetermined condition, determining whether or not correction processing is to be performed on the image data, and performing printing.

Further, another object of the present invention is to provide image printing apparatus, image printing system and control method for, if the image correction condition is automatic correction, determining whether or not automatic correction is to be performed in correspondence with image data file format, and performing printing.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Hereinbelow, a preferred embodiment of the present invention will now be described in detail in accordance with the accompanying drawings.

Figure 1:
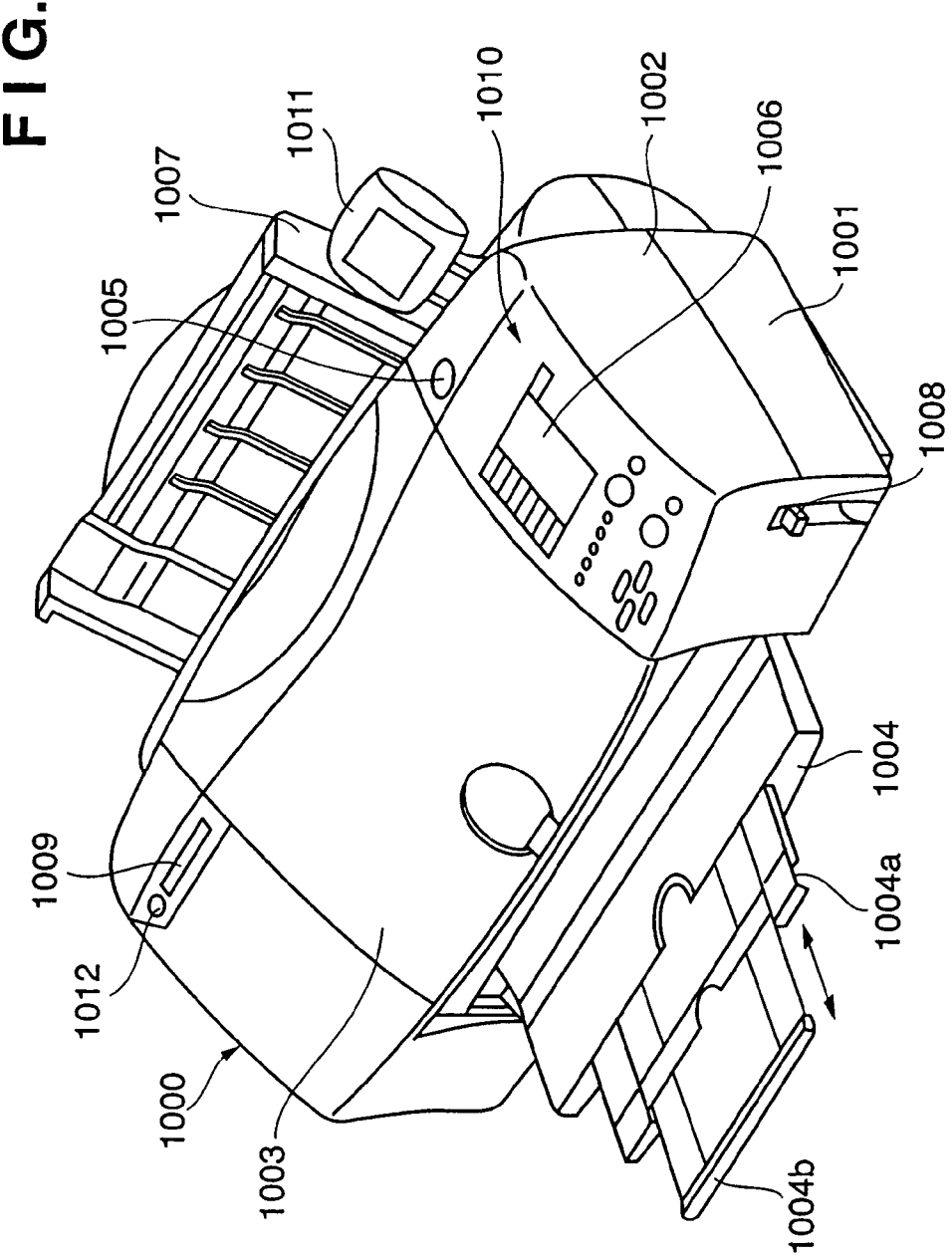
FIG. 1 depicts a schematic perspective view showing a photo-direct printer apparatus according to an embodiment of the present invention.

FIG. 1 depicts a schematic perspective view showing a photo-direct printer apparatus 1000 according to the embodiment of the present invention. The photo-direct printer has a general PC printer function of receiving data from a host computer (PC) and print-outputting the data, and a function of directly reading image data stored in a storage medium such as a memory card and print-outputting the data, or receiving image data from a digital camera and print-outputting the data.

In FIG. 1, the main body which defines the casing of the photo-direct printer apparatus 1000 according to the present embodiment has a lower case 1001, an upper case 1002, an access cover 1003 and a discharge tray 1004 as casing members. The lower case 1001 forms almost the lower half of the apparatus 1000, whereas the upper case 1002 forms almost the upper half of the main body. A combination of these cases forms a hollow structure with a storage space where each mechanism to be described later is accommodated. The upper and front surfaces of the cases have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front surface side to open the opening. Print sheets can be discharged from the opening, and the discharged print sheets can be sequentially stacked. The discharge tray 1004 houses two auxiliary trays 1004a and 1004b. These trays are selectively pulled out to enlarge/reduce the paper support area in three stages in accordance with necessity.

The access cover 1003 is rotatably held at one end by the upper case 1002 so as to open/close the opening formed in the upper surface. Opening the access cover 1003 enables exchanging a print head cartridge (not shown), ink tank (not shown) or the like accommodated in the main body. Although not shown, a projection formed on the back surface of the access cover 1003 rotates a cover opening/closing lever when the access cover 1003 is opened/closed. The lever rotation position is detected by a micro switch or the like, thereby detecting the open/closed state of the access cover.

A power switch 1005 is provided with the upper surface of the upper case 1002. An operation panel 1010 having a liquid crystal display 1006, various key switches, and the like is arranged on the right side of the upper case 1002. The structure of the operation panel 1010 will be described in detail with reference to FIG. 3. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a compact flash memory, smart media and memory stick. Numeral 1011 denotes a viewer (liquid crystal display) which is detachable from the apparatus main body and is used for display of image of one frame, an index image and the like when images stored in the PC card are searched for an image to be printed; and numeral 1012 denotes a terminal for connection with a digital camera to be described later. A USB bus connector for connection with a personal computer (PC) is provided with the rear surface of the apparatus main body (not shown in FIG. 1).

Figure 2:
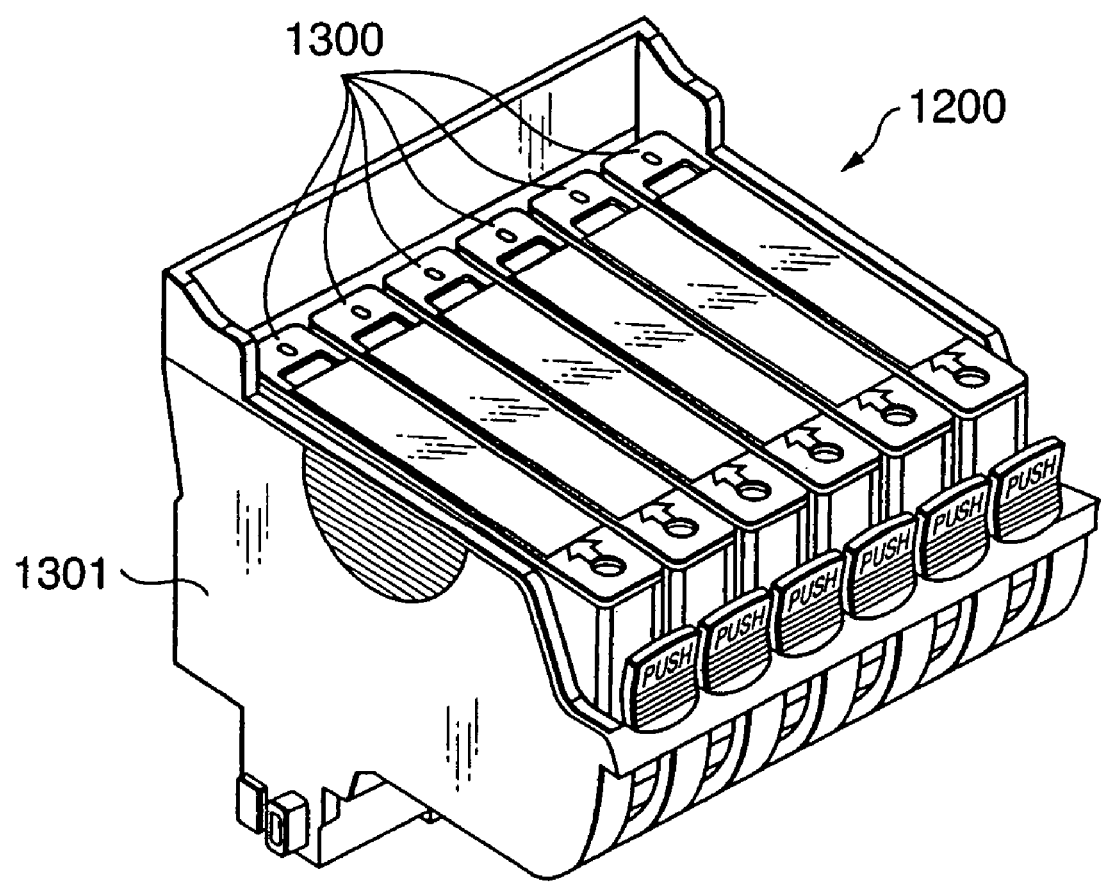
FIG. 2 depicts a schematic perspective view showing the construction of print head of the photo-direct printer apparatus according to the embodiment.

FIG. 2 depicts a schematic perspective view showing the arrangement of print head of the photo-direct printer apparatus 1000 according to the embodiment.

As shown in FIG. 2, a print head cartridge 1200 in this embodiment has ink tanks 1300 which accommodate inks, and a print head 1301 which discharges inks supplied from the ink tanks 1300 from nozzles in accordance with print information. As a so-called cartridge head is employed as the print head 1301, it is detachably mounted in a carriage 1102. In printing, the print head cartridge 1200 is scanned along a carriage shaft, and a color image is printed on a print sheet along with the operation of the print head cartridge 1200. To achieve high-quality color printing like a photograph, for example, the black, light cyan (LC), light magenta (LM), cyan, magenta, and yellow ink tanks are independently set in the print head cartridge 1301 shown in FIG. 2. Each ink tank is detachable from the print head 1301.

In this embodiment, the apparatus using the above-described 6 color inks will be described. However, the present invention is not limited to the use of 6 color inks, but may be applied to an ink-jet printer which performs printing by using 4 color inks, black, cyan, magenta and yellow. In this case, each of 4 independent ink tanks may be detachably set in the print head 1301.

Figure 3:
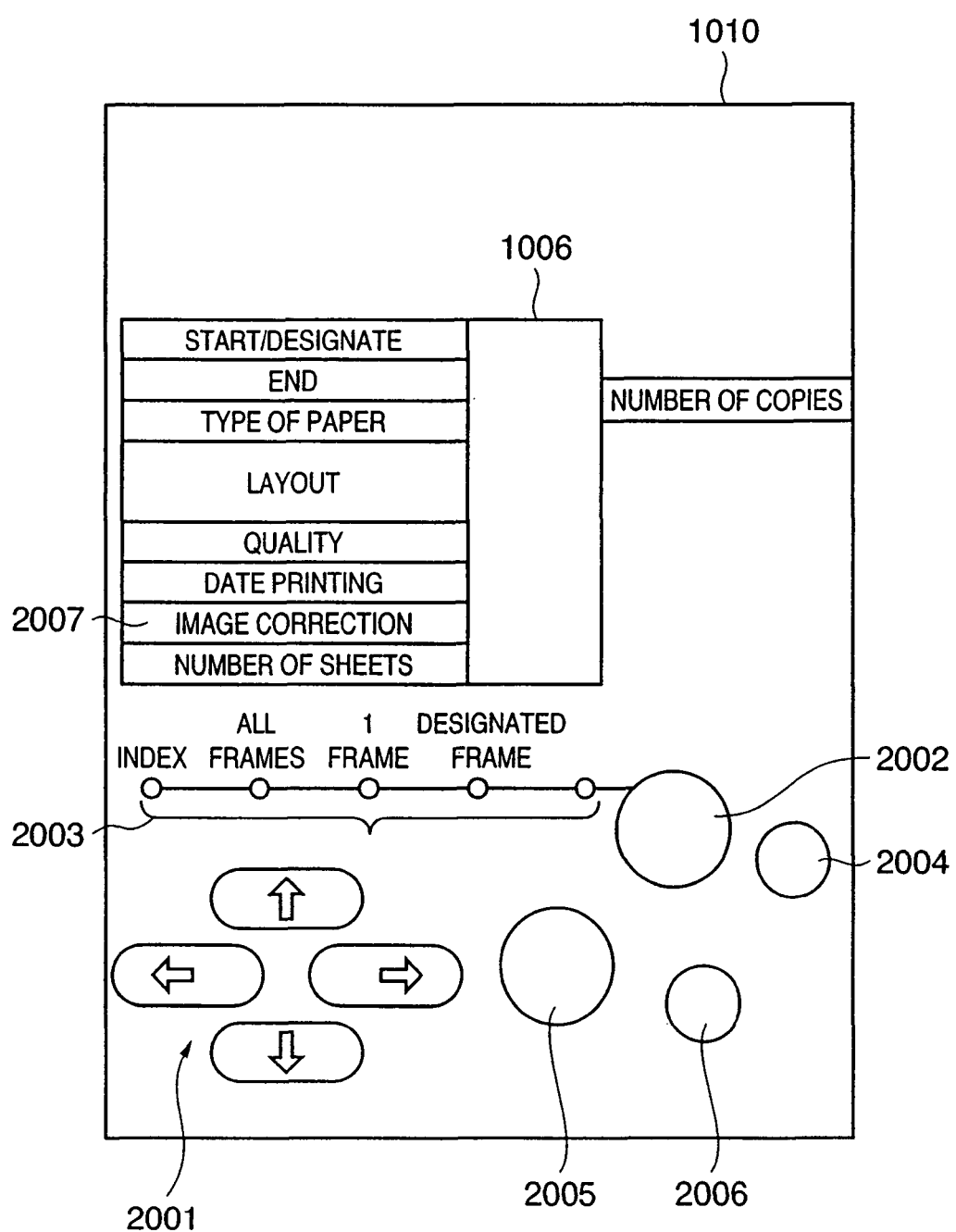
FIG. 3 depicts a schematic view showing an operation panel of the photo-direct printer apparatus according to the embodiment.

FIG. 3 depicts a schematic view showing the operation panel 1010 according to the present embodiment.

In FIG. 3, the liquid crystal display 1006 displays menu items for various settings of data on items printed on the right and left of the display 1006. The displayed items are the first photograph number of a print range, a designated frame number (start/designate), the last photograph number of the print range (end), the number of prints (number of copies), the type of paper (print sheet) used for printing (paper type), setting of the number of photographs to be printed on one paper sheet (layout), designation of print quality (quality), designation whether to a photographing date is printed (date printing), designation whether or not a photograph is corrected and printed (image correction), and display of the number of paper sheets necessary for printing (number of paper sheets). These items are selected or designated with cursor keys 2001. Numeral 2002 denotes a mode key which allows selection of the type of printing (index printing, printing of all frames, printing of one frame, and the like) every time this key is depressed, and one of LEDs 2003 is turned on in correspondence with the depressed key.

Figure 12:
FIG. 12 depicts a table showing image correction settings according to the embodiment.

In the present embodiment, in an item 2007 of the liquid crystal display 2006 for designation of image correction, settings of 5 image correction items as shown in FIG. 12 can be selected by using the cursor keys 2001 as "AT", "OFF", "ON", "APP ON", "VP ON", "AT" every time the cursor key is depressed. Further, when the type of printing is changed by operation of the mode key 2002, the item of image correction is automatically set to "AT". Note that in FIG. 12, "AT" means automatic correction; "OFF", turning off the image correction function (disabling the operation)"; and "ON", turning on the image correction function (enabling the operation). "APP ON" is abbreviation from "Auto Photo Perfect" as setting for enabling the correction function on a photographic image. "VP ON" means setting for image enhancement processing.

Numeral 2004 denotes a maintenance key for performing printer maintenance such as cleaning of the print head 1301 as shown in FIG. 2; numeral 2005 denotes a print start key which is depressed to designate the start of printing or establish maintenance setting; and numeral 2006 denotes a print stop key which is depressed to stop printing or designate to stop a maintenance processing.

Figure 4:
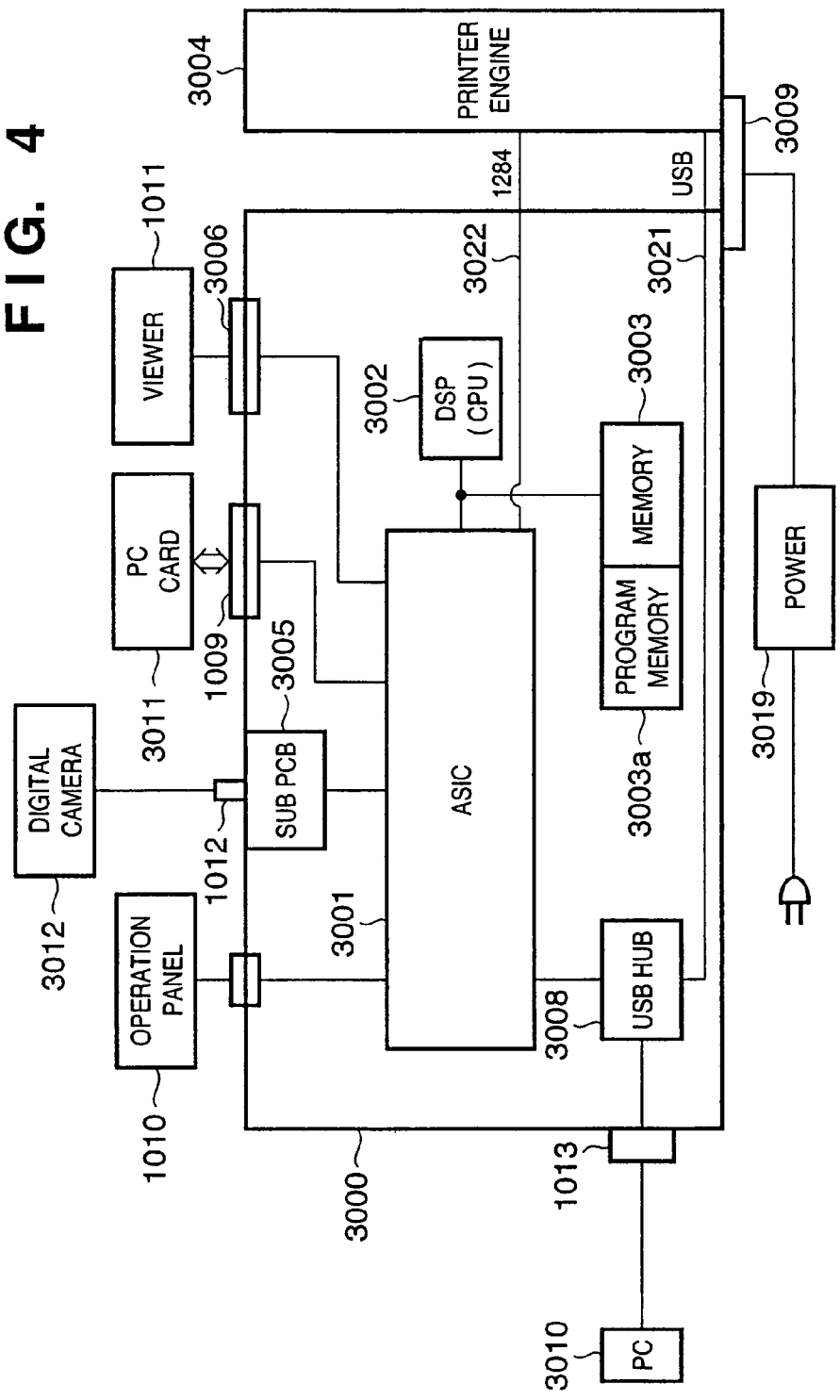
FIG. 4 is a block diagram showing the arrangement of principal elements concerning control of the photo-direct printer apparatus according to the embodiment.

Next, the arrangement of the principal elements concerning control of the photo-direct printer apparatus according to the present embodiment will be explained with reference to FIG. 4. In FIG. 4, elements corresponding to those in the above-described figures have the same reference numerals, and explanations thereof will be omitted.

In FIG. 4, numeral 3000 denotes a controller (control board); numeral 3001 denotes an ASIC (application specific LSI) whose arrangement will be described in detail below with reference to the block diagram of FIG. 5; numeral 3002 denotes a DSP (Digital Signal Processor) which incorporates a CPU and performs various control processings to be described later, and image processings such as conversion from luminance (RGB) signals to density (CMYK) signals, scaling, gamma conversion, and error diffusion; numeral 3003 denotes a memory having a program memory 3003a for storing the control program of the CPU of the DSP 3002, a RAM area for storing variables and the like upon execution of program, and a memory area functioning as a work memory for storing image data and various data; numeral 3004 denotes a printer engine which is an ink-jet print type printer engine for printing a color image by using a plurality of color inks; numeral 3005 denotes a connector serving as a port for connection with a digital camera 3012; numeral 3006 denotes a connector for connection with the viewer 1011; and numeral 3008 denotes a USB bus hub (USB hub) which transmits data from a PC 3010 to the printer engine 3004 via a USB bus 3021 when the printer apparatus 1000 performs printing based on image data from the PC 3010. The connected PC 3010 can directly exchange data and signals with the printer engine 3004 and execute printing (functions as a general PC printer). Numeral 3009 denotes a power connector which receives a DC voltage converted from a commercial AC voltage from a power supply 3019. The PC 3010 is a general personal computer and is connected to the printer apparatus 1000 via the USB connector 1013. Numeral 3011 denotes a memory card (PC card) described above; and numeral 3012 denotes the digital camera. Note that signal exchange between the controller 3000 and the printer engine 3004 is performed via the above-described USB bus 3021 or an IEEE 1284 bus 3022.

Figure 5:
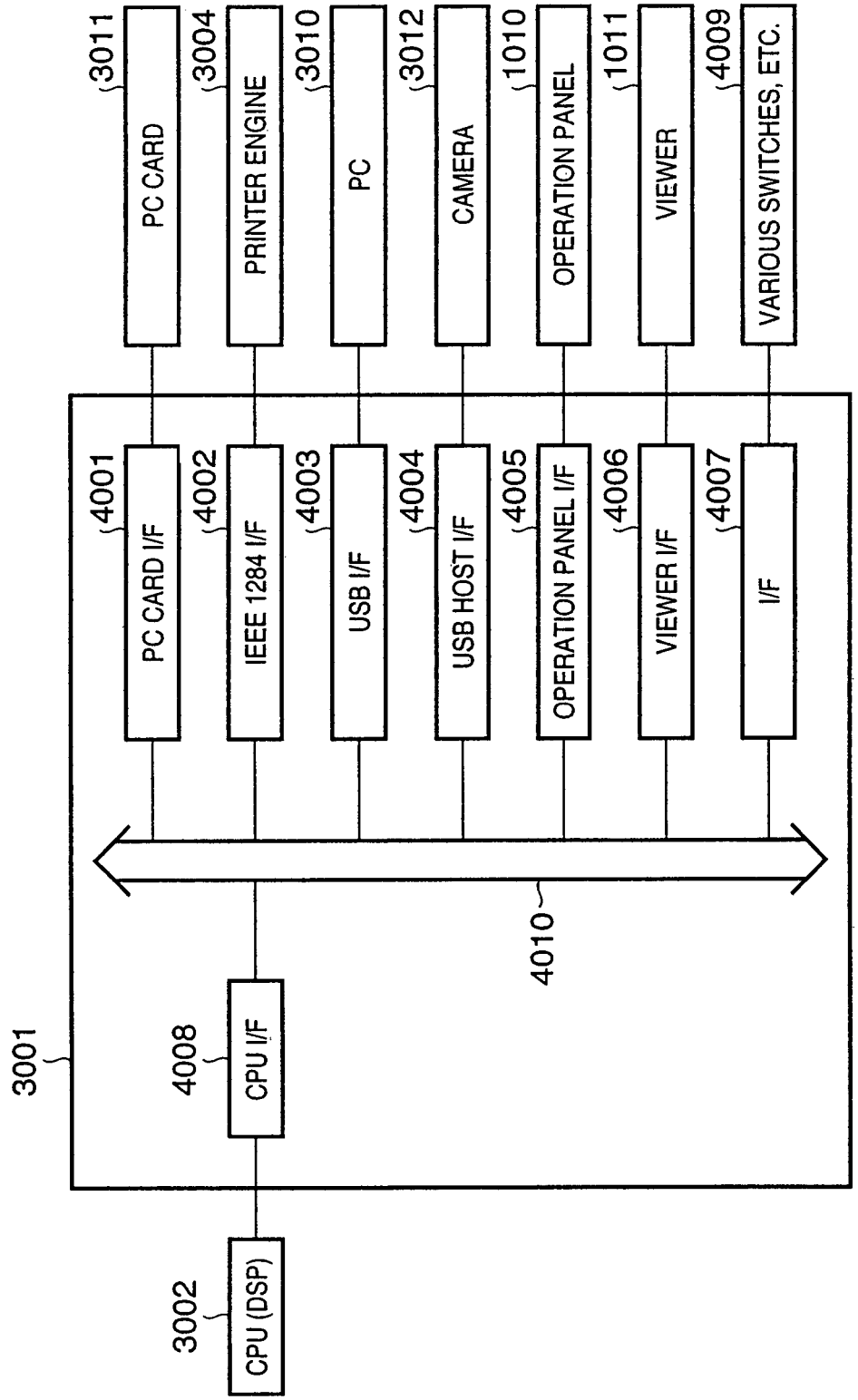
FIG. 5 is a block diagram showing the construction of ASIC of the photo-direct printer apparatus according to the embodiment.

FIG. 5 is a block diagram showing the construction of the ASIC 3001. Also in FIG. 5, elements corresponding to those in the above-described figures have the same reference numerals, and explanations thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface is a bus used for print-outputting image data stored in the digital camera 3012 or PC card 3011. Numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface with various switches, an LED 4009, and the like; numeral 4008 denotes a CPU interface which controls data exchange between these interfaces and the DSP 3002; and numeral 4010 denotes an internal bus (ASIC bus) which interconnects these elements.

Figure 6:
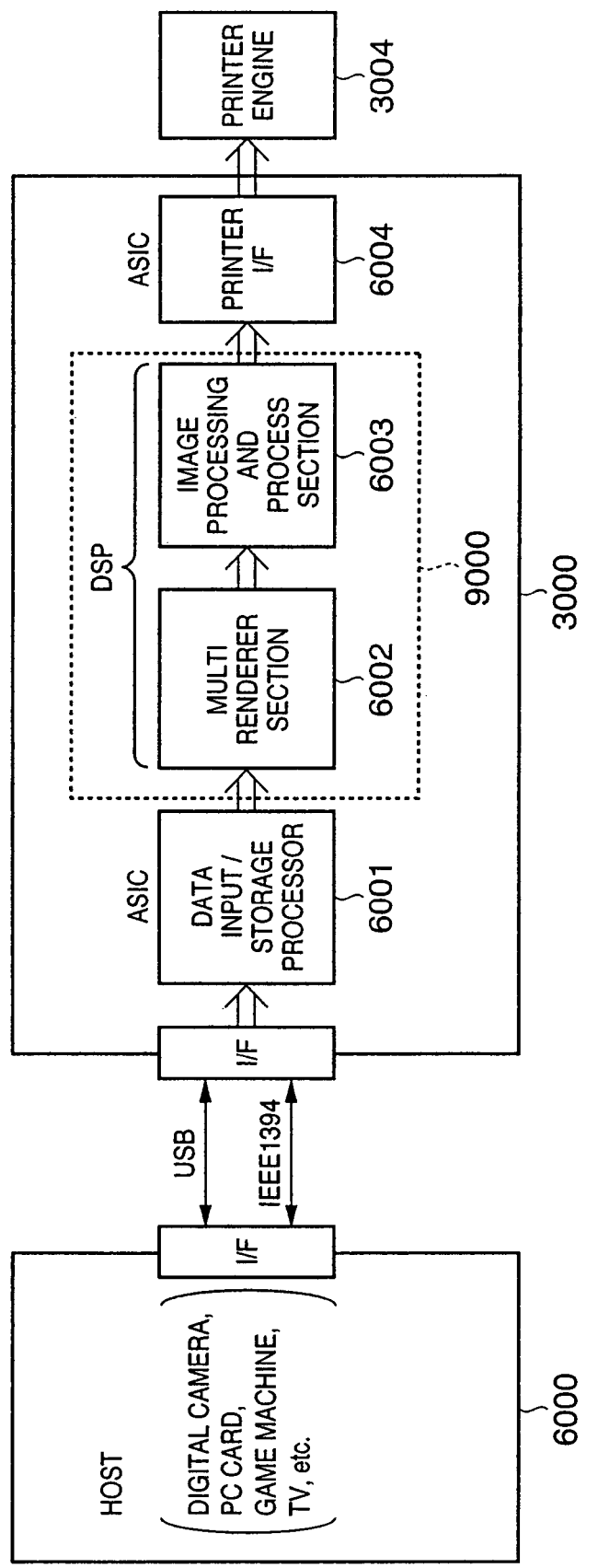
FIG. 6 is a functional block diagram showing interfaces and the arrangement of functions for image processing control of the photo-direct printer apparatus according to the embodiment.

FIG. 6 is a functional block diagram showing the interfaces and the arrangement of functions for image processing control of the photo-direct printer apparatus 1000 according to the present embodiment. Also in FIG. 6, elements corresponding to those in the above-described figures have the same reference numerals, and explanations thereof will be omitted.

Numeral 6000 corresponds to a host (image data source) seen from the photo-direct printer apparatus 1000. The host 6000 includes the PC 3010 serving as the host computer, the digital camera 3012, and the PC card 3011 described above, and a game machine, television device (neither is shown), and the like. The host 6000 is connected via an interface such as a USB bus, IEEE 1284, or IEEE 1394. Further, as the interface, Bluetooth or the like may be used.

The function of the control board 3000 described above further includes a data input/storage processor 6001 and a printer interface 6004 for outputting print data to the printer engine 3004, which are implemented by the ASIC 3001, and a multi-renderer section 6002 and image processing and process section 6003 executed by the DSP 3002.

Figure 7:
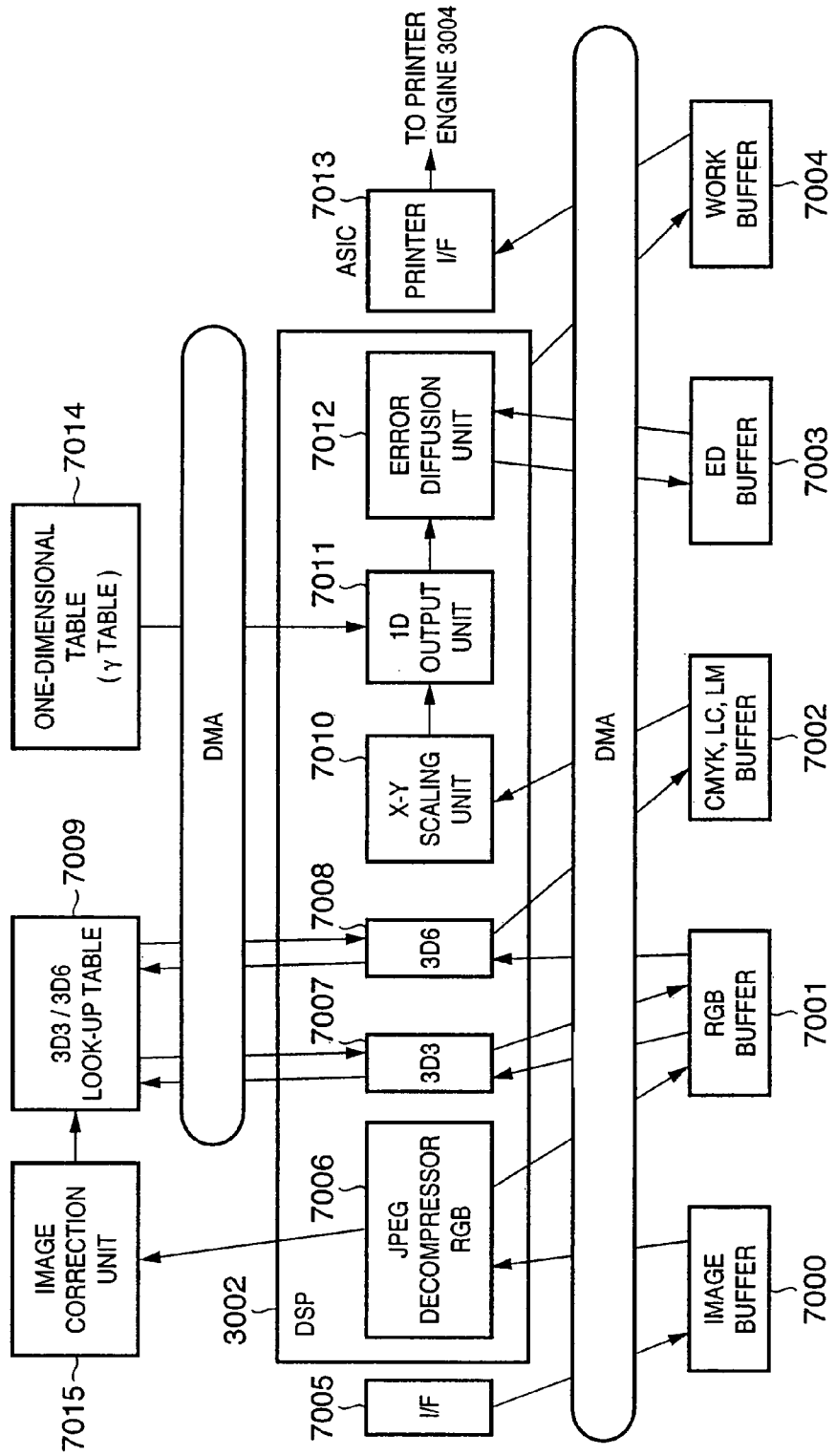
FIG. 7 is a functional block diagram showing the arrangement of the functions for image processing control of the photo-direct printer apparatus according to the embodiment.

FIG. 7 is a functional block diagram showing the arrangement of the functions for image processing control in the photo-direct printer apparatus 1000 according to the present embodiment in more detail. Also in FIG. 7, elements corresponding to those in the above-described figure have the same reference numerals, and explanations thereof will be omitted.

In FIG. 7, image data or JPEG-compressed image data inputted from the PC card 3011, camera 3012, or PC 3010 via an interface 7005 such as a USB bus interface is temporarily stored in an image buffer 7000. If the stored data is compressed data, it is decompressed by a JPEG decompressor 7006. The decompressed data is converted from Y, Cb and Cr signals into R, G and B signals, and the converted signals are then stored in an RGB buffer 7001. A 3D3 (7007) converts the color space of RGB data by referring to a look-up table 7009. A 3D6 (7008) converts R, G and B signals into signals for 6 colors of C, M, Y, K, LC (light cyan) and LM (light magenta) by referring to the look-up table 7009. Numeral 7010 denotes an X-Y scaling unit which changes image sizes in the X and/or Y direction; numeral 7011 denotes a 1D output unit which executes color processing such as γ conversion by referring to a one-dimensional table 7014; and numeral 7012 denotes an error diffusion (ED) unit which performs error diffusion processing on multilevel image data to generate binarized image data (or multilevel) data for each color. The binarized (or multilevel data) generated in this manner is stored in an ED buffer 7003. Numeral 7004 denotes a work buffer for storing print data corresponding to each of a plurality of print heads discharging inks of respective colors. The generated print data corresponding to each print head is transmitted to the printer engine 3004 via a printer interface 7013, and printing is performs. Numeral 7015 denotes an image correction unit which generates the 3D3 look-up table 7009 utilized by the 3D3 (7007). Image correction is performed by the image correction unit 7015 by referring to the contents of the table 7009 to control color space, contrast and the like, in accordance with, e.g., input image information.

Note that in FIG. 7, the X-Y scaling unit 7010 performs size change processing for an image in the X and/or Y direction after processing by the 3D6 (7008). However, the present invention is not limited to this processing, and as will be described later with reference to FIG. 11, the size change processing may be performed before color conversion to RGB data.

As described above, in the photo-direct printer apparatus 1000, the DSP 3002 executes control of each unit of the apparatus 1000 in addition to image processing. The DSP 3002 also has a parallel processing function and can parallelly execute the 3D3 processing, 3D6 processing, X-Y scaling, 1D output processing, error diffusion processing, and the like. The DSP 3002 is, e.g., TMS320 DSP by Texas Instruments (TI), which executes control to be described later in accordance with a control program stored in the program memory 3003a shown in FIG. 4.

Note that in the present embodiment, the DSP 3002 capable of parallel processing is employed for the purpose of obtaining high total throughput by increasing the speed of image processing, however, a CPU of another type such as RISC or CISC can be employed.

Figure 8:
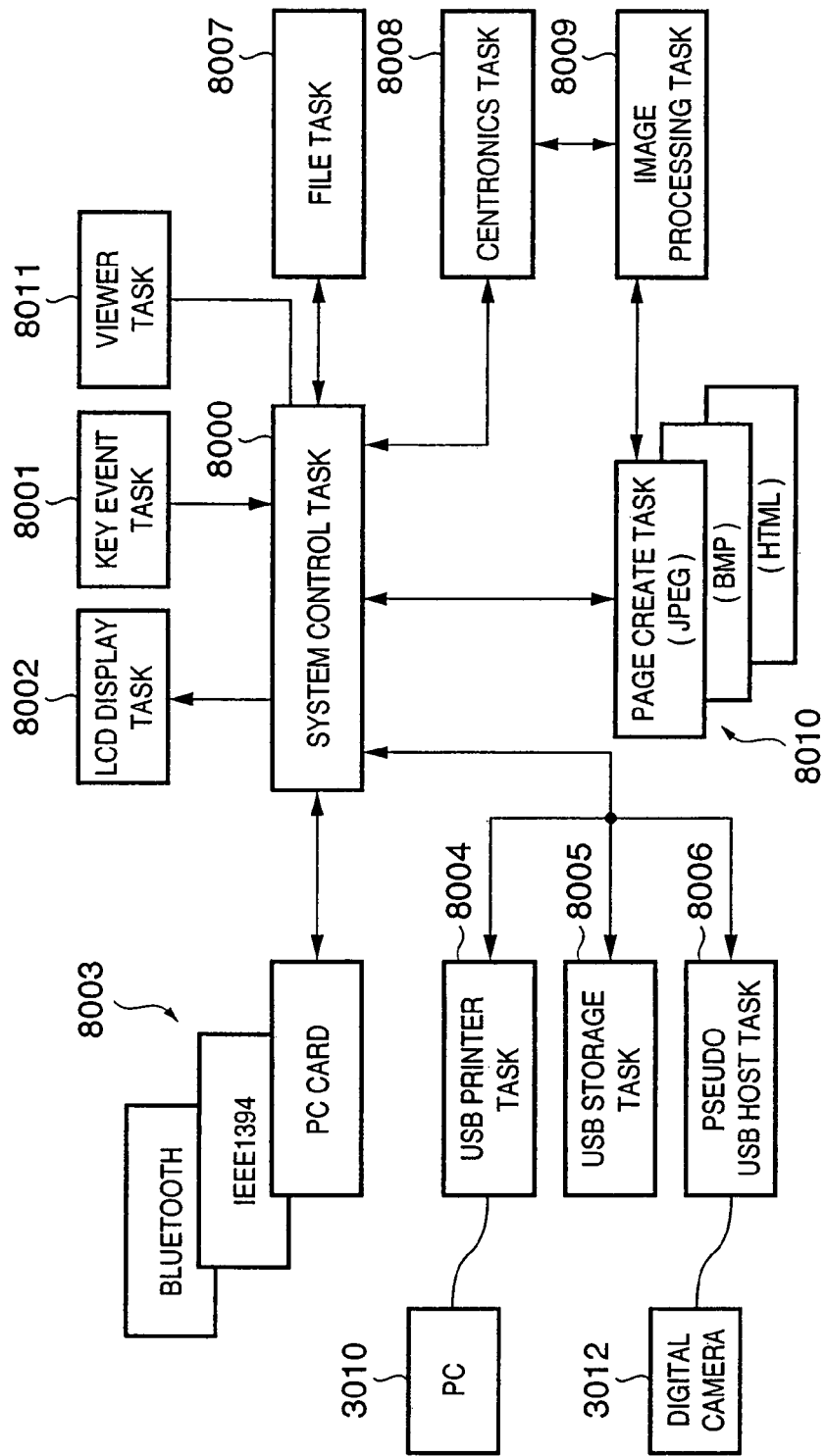
FIG. 8 is a block diagram showing a multi-task structure of tasks of functional modules in a control program of the photo-direct printer apparatus according to the embodiment.

This control program is arranged in a multitask form in which a task is created for each functional module. FIG. 8 shows a main task structure.

In FIG. 8, reference numeral 8000 denotes a system control task which arbitrates an entire system by, e.g., issuance of each event between tasks, control of sequence at the end of an event, and exclusive processing; numeral 8001 denotes a key event task which analyzes a depressed key on the basis of key operation at the operation panel 1010; numeral 8002 denotes a display task for the LCD 1006, which is activated when a UI control request, message display request, or the like is made on the display 1006, and which executes display control to the display 1006; numeral 8003 denotes tasks activated by reading/writing data from/in the PC card 3011 or inputting/outputting to/from data via the IEEE 1394 or Bluetooth; and numeral 8004 denotes a USB printer task activated by data transfer from the PC 3010 connected via the USB bus. The USB printer task 8004 is activated by a printer interrupt sent via a USB bus, and executes a function as a PC printer. Numeral 8005 denotes a USB storage task which is activated by the system control task 8000 and which initializes firmware. The USB storage task 8005 starts/ends a USB control task and USB bulk task as lower tasks in accordance with a message from the system control task 8000. Numeral 8006 denotes a pseudo USB host task which is activated by the USB task and which executes data read from the digital camera 3012 connected via a USB bus and various types of communication controls. Numeral 8007 denotes a file task which performs input/output control such as file open, file close, file read, and file write. Numeral 8008 denotes a Centronics task activated from a Centronics interface connected to the printer engine 3004. The Centronics task 8008 executes DMA transmission of print data, status reply, and the like. Numeral 8009 denotes an image processing task which receives RGB data, generates YMCK data by 3D processing, tetrahedron interpolation, color conversion, scaling, and error diffusion described above, and finally generates raster image data to be outputted to the printer engine 3004. Numeral 8010 denotes a page create task which expands JPEG data to convert it into image data, generates image data from data in a BMP format, or generates image data from an HTML document. In addition, the page create task 8010 performs image processing such as photograph data correction and grayscale correction, and generates RGB data. Numeral 8011 denotes a viewer task which executes display control to the viewer 1011 when the viewer 1011 has been connected.

The outline of operation of the above-described construction will be described with reference to FIG. 9. In the photo-direct printer apparatus 1000 according to the present embodiment, image printing is performed in the following 3 modes.

<General PC Printer Mode>

This is a print mode of a general PC printer of printing an image based on print data sent from the PC 3010.

In this mode, when the data from the PC 3010 in FIG. 4 is inputted via the connector 1013, the data is directly sent to the printer engine 3004 via the USB bus hub 3008 and the USB bus 3021, and printing is performed based on the data from the PC 3010. That is, the PC 3010 inputs image data 9100 of digital photograph or the like, which an operator wants to print, from a memory card, a hard disk or a network such as the Internet, then performs image processing to be described in FIG. 11 by the image processor 9010, and outputs the processed data to the printer apparatus 1000, thereby a desired image can be printed.

<PC-Card Direct Print Mode>

Figure 11:
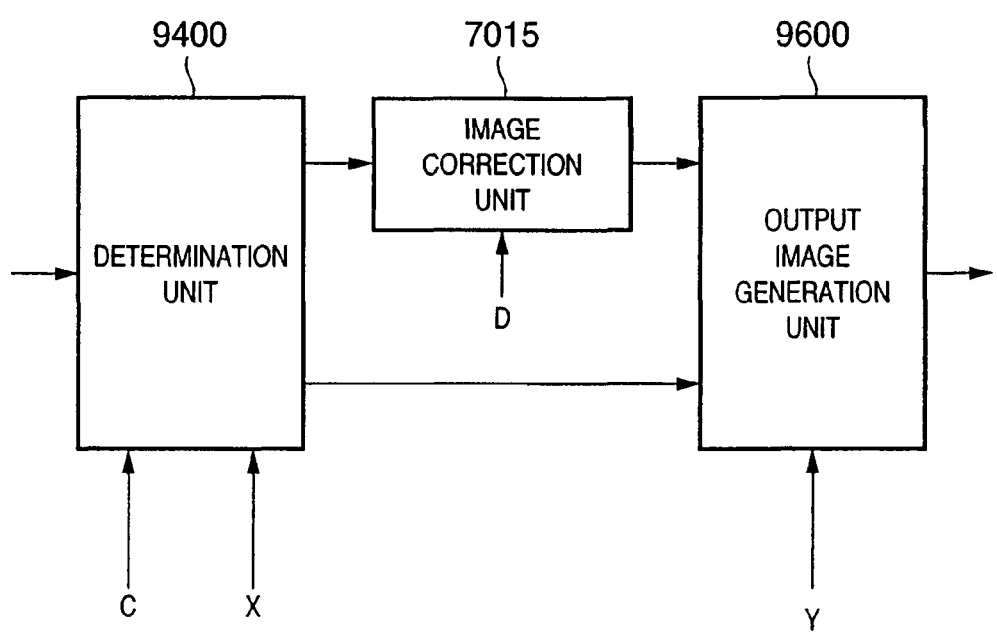
FIG. 11 is a block diagram showing image correction control by an image processor of the photo-direct printer apparatus according to the embodiment.

When the PC card 3011 is attached/detached to/from the card slot 1009, an interrupt occurs, thereby the DSP 3002 can detect whether the PC card 3011 has been attached or detached (removed). When the PC card 3011 is attached to the card slot, compressed (e.g., JPEG compressed) image data stored in the PC card 3011 is read and stored into the memory 3003. Then, the compressed image data is decompressed and again stored into the memory 3003. Next, if an instruction to print-output the stored image data is issued by using the operation panel 1010, conversion from RGB signals to YMCK signals, gamma conversion, error diffusion and the like, are performed to convert the data into data printable by the printer engine 3004, and the data is outputted via the IEEE 1284 interface 4002 to the printer engine 3004, then printing is performed based on the data. That is, the image data 9100 of digital photograph or the like which the operator wants to print, inputted from the PC card 3011, is read then the image processing to be described in FIG. 11 is performed by the image processor 9010, and the data is outputted to the printer engine 3004, thereby a desired image can be printed.

<Camera 3012 Direct Print Mode>

As the photo-direct printer apparatus 1000 according to the present embodiment and the digital camera 3012 are connected with each other via a cable, image data from the digital camera 3012 can be directly print-outputted by the printer apparatus 1000.

In this case, only a camera mark is displayed on the display 1006 of the operation panel 1010, and display and operation at the operation panel 1010 are disabled, and display to the viewer 1011 is also disabled. Accordingly, hereinbelow, only key operation at the digital camera 3012 and image display on a display unit (not shown) of the digital camera 3012 are enabled, and the user can issue a print instruction by using the digital camera 3012. That is, when a print instruction is issued from the digital camera 3012, the photo-direct printer apparatus 1000 reads the image data 9100 to be print-outputted from the digital camera 3012, performs the image processing to be described in FIG. 11 by an image processor 9000 of the photo-direct printer apparatus 1000, and outputs the data to the printer engine 3004, thereby prints a desired image. Note that the image processor 9000 is realized by the above-described DSP 3002 and the program stored in the program memory 3003a.

Figure 9:
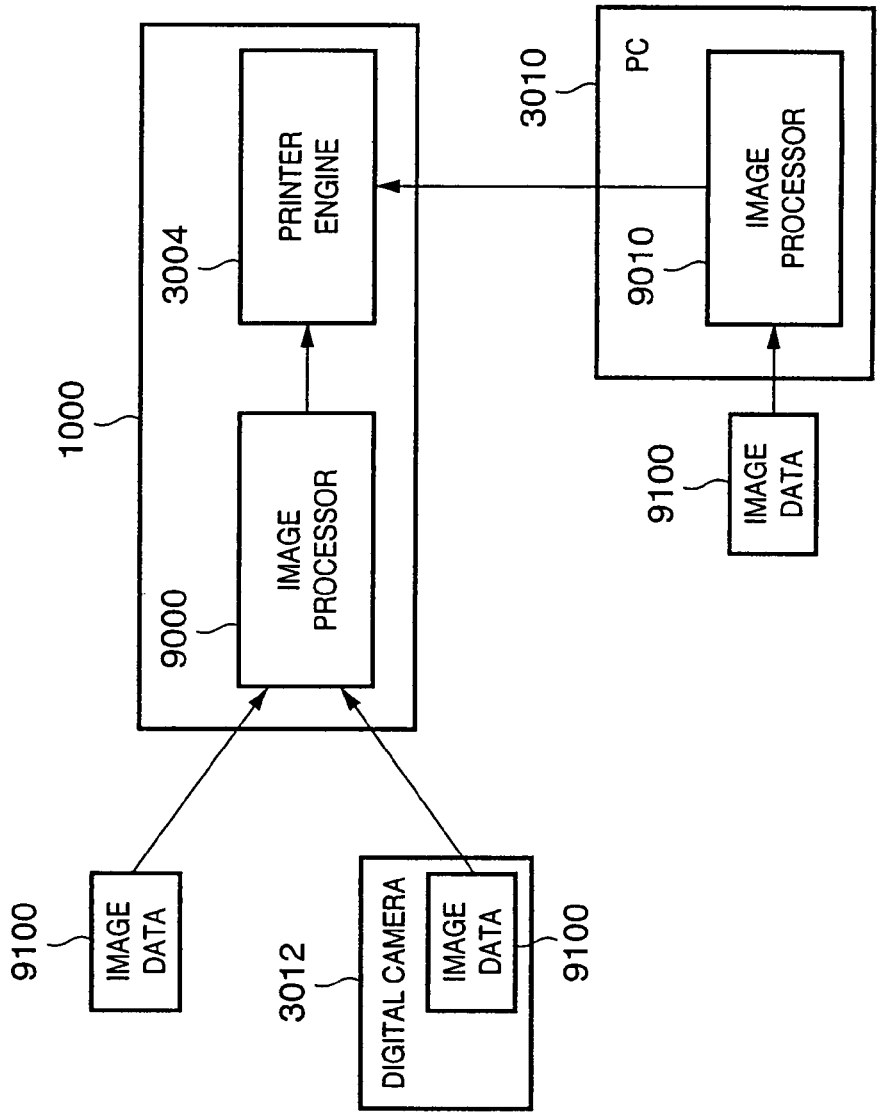
FIG. 9 is a block diagram showing image processing between the photo-direct printer apparatus and a digital camera and a PC according to the embodiment.
Figure 10A:
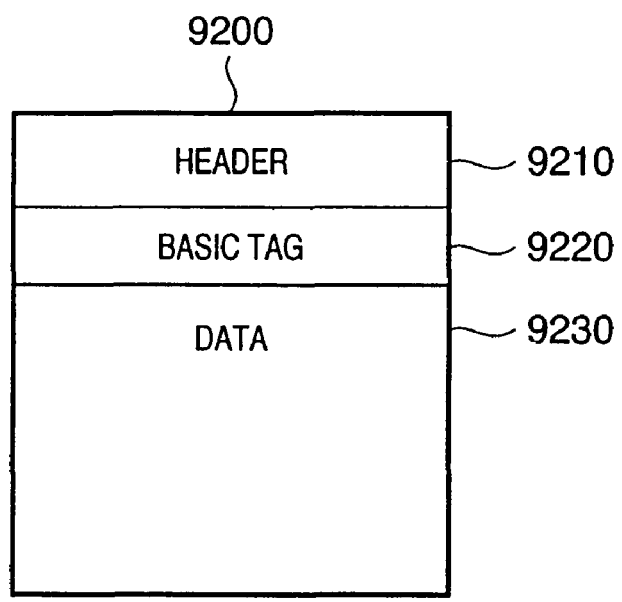
FIG. 10A depicts a table showing a file format of old format image data.
Figure 10B:
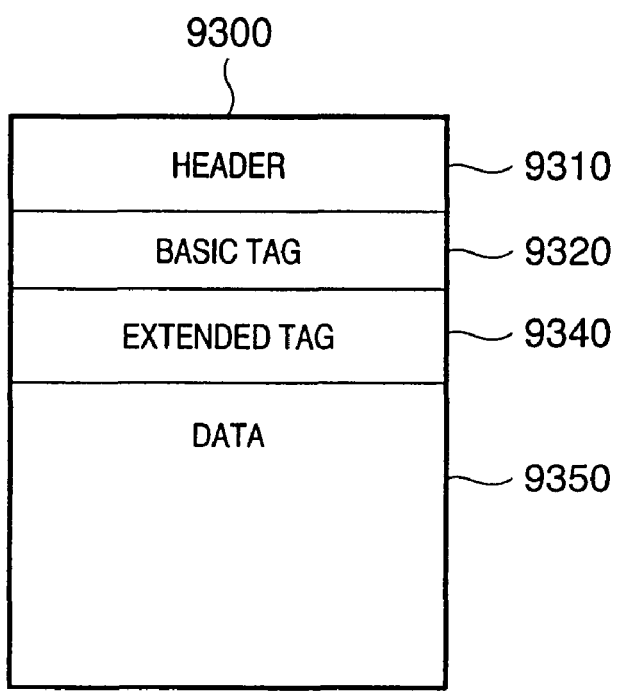
FIG. 10B depicts a table showing a file format of new format image data.

FIGS. 10A and 10B depict tables showing the data format (file) of the image data 9100 as shown in FIG. 9. In the present embodiment, at least 2 types of file formats, old format data 9200 as shown in FIG. 10A and new format data 9300 as shown in FIG. 10B can be discriminated.

In the figures, headers 9210 and 9310 include header information such as version information such that at least new/old data structure can be discriminated even if file extension such as JPG or TIF is the same. Basic tags 9220 and 9320 include image sensing information on image size, aperture upon image sensing, exposure and the like. An extended tag 9340 includes information added in the new format data 9300 which includes detailed image-sensing information, extended from the conventional basic tag information 9220, and the like. The data 9230 and 9350 include thumbnail image data and main image data.

FIG. 11 is a block diagram showing the functional construction of the image processor 9000 of the photo-direct printer apparatus 1000 according to the embodiment. Further, FIG. 12 shows an example of selection of settings "X", "Y" and "D" corresponding to settings in image correction items 2007 of the above-described liquid crystal display 1006.

If the image data 9100 corresponds to the new format file 9300 as shown in FIG. 10B, settings indicated in a new format column 12000 in FIG. 12 are selected; on the other hand, if the image data 9100 corresponds to the old format file 9200 as shown in FIG. 10A, settings indicated in an old format column 12001 are selected. Note that the alphabets "X", "Y" and "D" in FIG. 11 correspond to those in FIG. 12. "X" indicates whether image correction is "ON (necessary)" or "OFF (unnecessary)"; "D" indicates whether correction information is "present", "absent" or "correction is unnecessary"; and "Y" indicates whether color tone enhancement is "ON" or "OFF".

When a print request is issued from the operator, a determination unit 9400 skips the processing by the image correction unit 7015 if the X setting (image correction) is "OFF", then image data is outputted to an output image generation unit 9600, and an output image is generated. On the other hand, if the X setting is "ON", the file extension of image data to be print-outputted, the headers 9210 and 9310 in FIGS. 10A and 10B and the like are read by input of "C", and it is examined whether the image data is a new format file or an old format file. It is determined as a result that the image data is a new format file, the data is outputted, with selection of the D setting in the new format column 12000, to the image correction unit 7015. If it is determined that the image data is an old format file, the data is outputted, with selection of the D setting in the old format column 12001, to the image correction unit 7015. Then the image correction unit 7015 performs image correction in correspondence with the D setting. If the D setting is "present", the basic tag 9320 and the extended tag 9340 in FIG. 10B are read, then the image data is corrected based on the image sensing conditions and the like of the image data, such that the data has optimum contrast and color space, and print image data is generated by the output image generation unit 9600. Further, if the D setting is "absent", it is determined that the image data has been obtained on standard image sensing conditions, then the image data is corrected such that the data has standard contrast and color space and outputted to the output image generation unit 9600 for generation of print image data. The output image generation unit 9600 inputs image data processed by the determination unit 9400 and/or the image correction unit 7015 and printing conditions, and further, adds "ON"/"OFF" of color tone enhancement (process to obtain a vivid color tone) in correspondence with the Y setting to the required print conditions, and generates final print image data.

For example, in a case where "AT (automatic correction)" is set in the image correction items 2007 in FIG. 3, if image data of the new format file is inputted in this state, the X setting (image correction) is "ON", the Y setting (color tone enhancement) is "OFF", and the D setting is "(correction information) present". The determination unit 9400 determines that image correction is necessary since the X setting is "ON", and outputs the image data to the image correction unit 7015. The output image generation unit 9600 generates image data for printing without color tone enhancement processing in accordance with the Y setting (OFF), and outputs the data to the printer engine 3004.

Further, if image data of the old format file is inputted in this state, the X setting (image correction) is "OFF", the Y setting (color tone enhancement) is "OFF", and the D setting is "(correction information) absent". The determination unit 9400 determines that image correction is not necessary since the X setting is "OFF", and outputs the image data directly to the output image generation unit 9600. The output image generation unit 9600 generates print image data without color tone enhancement processing in accordance with the Y setting (OFF), and outputs the data to the printer engine 3004.

Similarly, in other cases, the image correction processing and the color tone enhancement processing are selectively performed in accordance with whether the image data is new format file data or old format file data, and print-outputted by the printer engine 3004 based on the result of processings.

Next, the outline of print processing by the DSP 3002 of the photo-direct printer apparatus 1000 according to the present embodiment will be described with reference to the flowcharts of FIGS. 13 to 17. Note that as the print processing by the DSP 3002 is executed in multi-task form, the entire flow of processing will be described.

Figure 13:
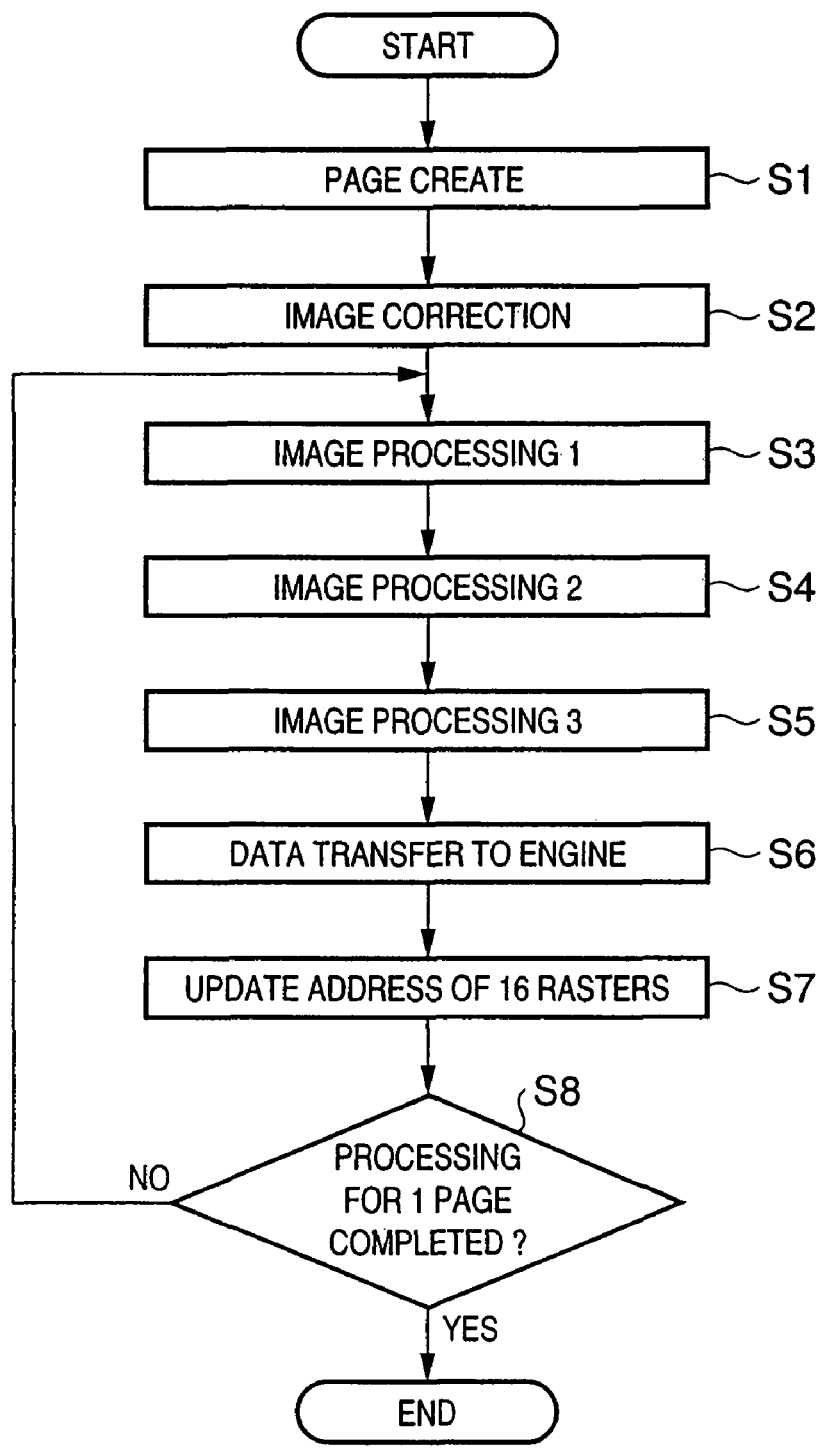
FIG. 13 is a flowchart showing image data processing in the photo-direct printer apparatus according to the embodiment.

FIG. 13 is a flowchart showing the outline of the processing by the DSP 3002 according to the present embodiment.

This processing is started by inputting image data from the PC card 3011 or the digital camera 3012. First, at step S1, page create processing is performed. That is, the format of page data is set. Next, at step S2, image correction processing is performed on the input image data. The process proceeds to step S3, at which "image processing 1" is performed, then at step S4, "image processing 2" is performed, and at step S5, "image processing 3" is performed. Note that the image correction processing and the "image processings 1 to 3", to be described later with reference to FIGS. 14 to 17, are actually performed in parallel. In the present embodiment, to perform image processing at a high speed utilizing a small memory area, the processing unit of image data is 16 rasters.

When the image processing has been completed and print data has been generated, the process proceeds to step S6, at which the generated print data is DMA-transmitted to the printer engine 3004. Then at step S7, to read image data to be processed next, the memory address is updated to move the address of the image buffer 7000 for 16 rasters. The process proceeds to step S8, at which it is determined whether or not image processing for 1 page has been completed, and if the image processing has not been completed, the process returns to step S3 to repeat the above-described processing. If it is determined at step S8 that the image processing for 1 page has been completed, the process ends.

Figure 14:
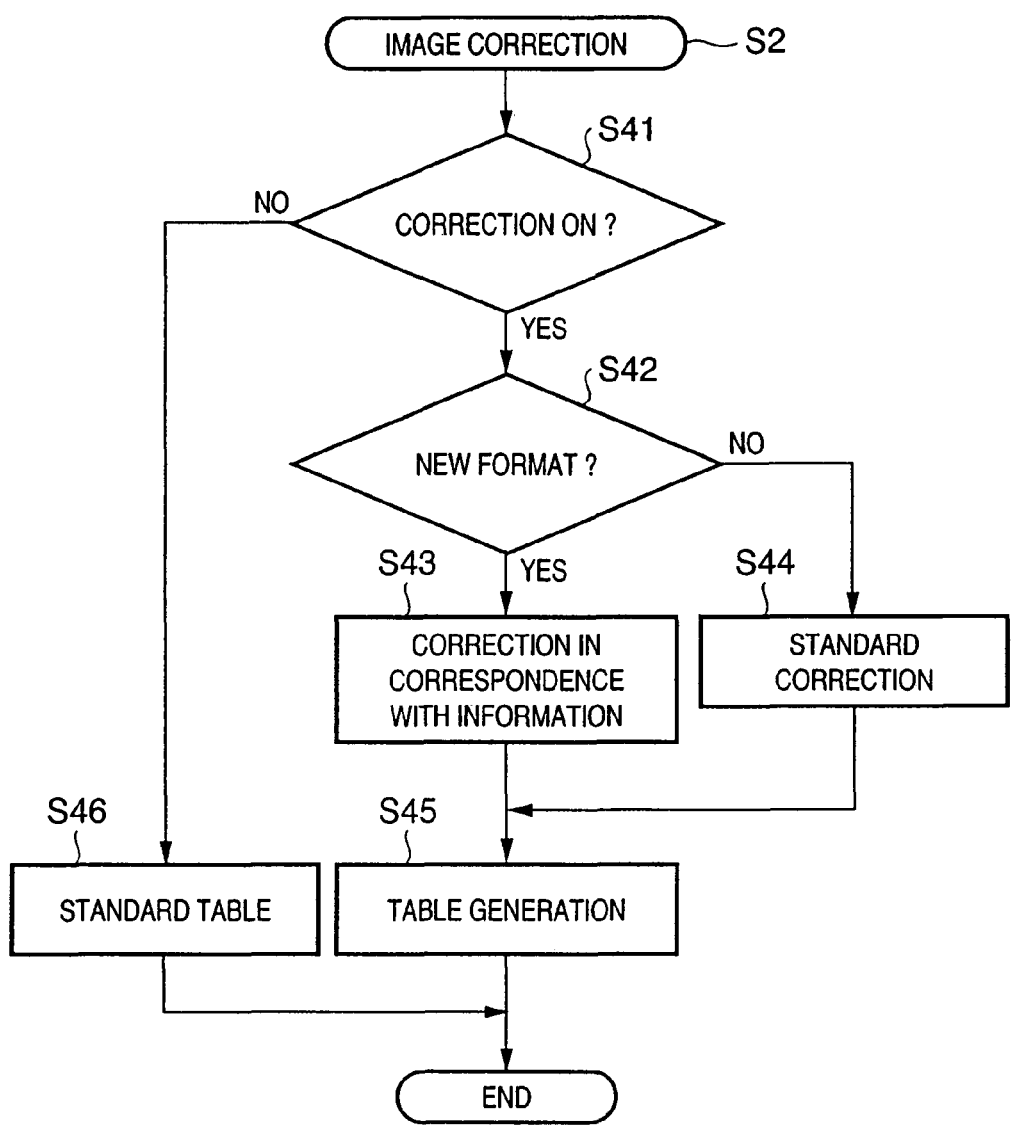
FIG. 14 is a flowchart showing image correction processing at step S2 in FIG. 13.

FIG. 14 is a flowchart showing the image correction processing at step S2 in FIG. 13. Note that this processing is executed by the determination unit 9400 and the image correction unit 7015 in FIG. 11.

First, at step S41, the X setting (image correction) described in FIG. 12 is examined. If the X setting is "OFF", the process proceeds to step S46, at which the 3D3 look-up table 7009 to which the 3D3 (7007) in FIG. 7 refers is set as a standard table, thereby the process ends without execution of image correction.

On the other hand, at step S41, if the X setting is "ON", the process proceeds to step S42, at which it is determined whether the data to be print-outputted is the new format file or the old format file, based the file extension of image data and the information in the headers 9210 and 9310 in FIGS. 10A and 10B. If it is determined that the data is the new format file, the process proceeds to step S43, at which the basic tag 9320 and the extension tag 9340 in FIG. 10B are read, then parameters are prepared to correct the image so as to obtain optimum contrast and color space based on image sensing conditions of the image data and the like, and the process proceeds to step S45.

On the other hand, if it is determined at step S42 that the data is the old format file, it is determined that the image data has been obtained on standard image sensing conditions, and the process proceeds to step S44. At step S44, parameters are prepared to correct the image so as to obtain standard contrast and color space, and the process proceeds to step S45. At step S45, the 3D3 look-up table 7009 to which the 3D3 (7007) refers is generated in correspondence with the parameters prepared at step S43 or S44, and the process ends. The generated 3D3 look-up table 7009 is referred to at step S23 of the flowchart in FIG. 16, thereby an output image subjected to desired image correction can be obtained.

Figure 15:
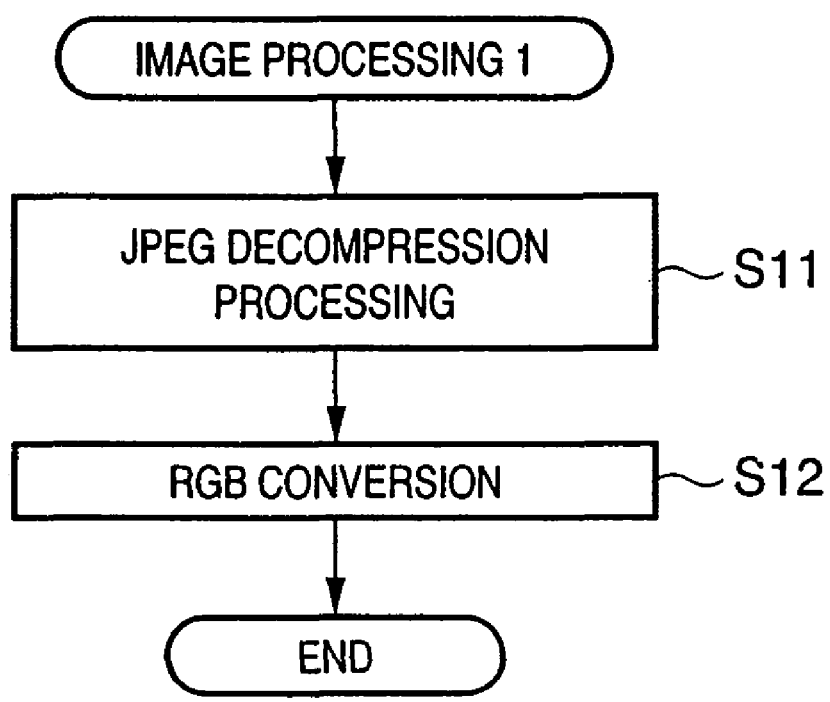
FIG. 15 is a flowchart showing "image processing 1" at step S3 in FIG. 13.

FIG. 15 is a flowchart showing the "image processing 1" at step S3 in FIG. 13.

First, at step S11, decompression processing is performed on JPEG or TIFF format image data. The decompression of JEPG data is generally performed by the Huffman decoding, inverse quantization and inverse discrete cosine transform, and as a result, Y, Cb and Cr data are generated. Then the process proceeds to step S12, at which the Y, Cb and Cr data are converted to R, G and B data. Note that the conversion is performed by using conversion expression in the ITU-R BT. 601 recommendation.

Figure 16:
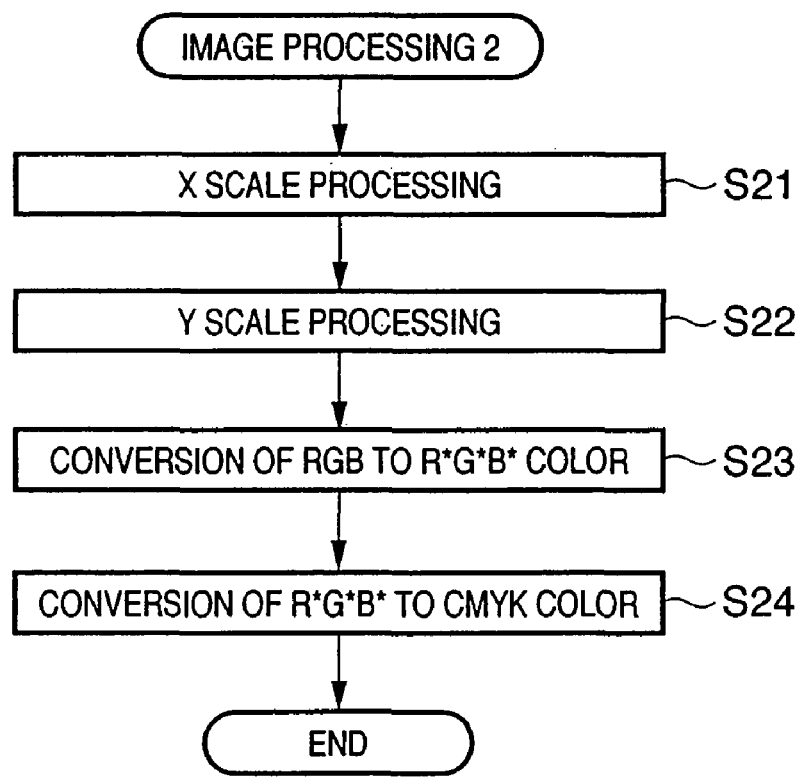
FIG. 16 is a flowchart showing "image processing 2" at step S4 in FIG. 13.

FIG. 16 is a flowchart showing the "image processing 2" at step S4 in FIG. 13.

First, at step S21, enlargement/reduction processing in a direction X (raster direction) is performed on the image data. Next, at step S22, enlargement/reduction processing in a direction Y (the direction of nozzle array of the print head 1301) is performed on the image data. The enlargement/reduction by linear interpolation is performed in correspondence with the size of actual print area. The process proceeds to step S23, at which the R, G and B color components are converted to R*, G* and B* components. That is, the respective 8-bit R, G and B data are converted to respective 8-bit R*, G* and B* data by using the three-dimensional look-up table (LUT) 7009. This processing, called color-space conversion processing (pre color processing), is performed for correction of difference between the color space of the input image and reproduction color space of the printer engine 3004.

Next, at step S24, the respective R, G and B color components are converted to C, M, Y and K color components. That is, the respective 8-bit R*, G* and B* data are converted to 6 color data, i.e., respective 8-bit C, M, Y, K, LC and LM data by using the three-dimensional LUT 7009. This processing, called color conversion processing (post color processing), is performed for conversion of input RGB color data to output CMYK color data.

In many cases, input image data are 3 additive primary colors (RGB) of light emitting device such as a display, however, in color representation by light reflection in use of printer or the like, 3 subtractive primary colors are employed. Accordingly, the above color conversion processing is performed. The three-dimensional LUT 7009 used in the pre color processing and the three-dimensional LUT 7009 used in the post color processing discretely hold data, and a value between held data is obtained by interpolation processing. Since the interpolation processing is well known, detailed description of the interpolation processing will be omitted.

Figure 17:
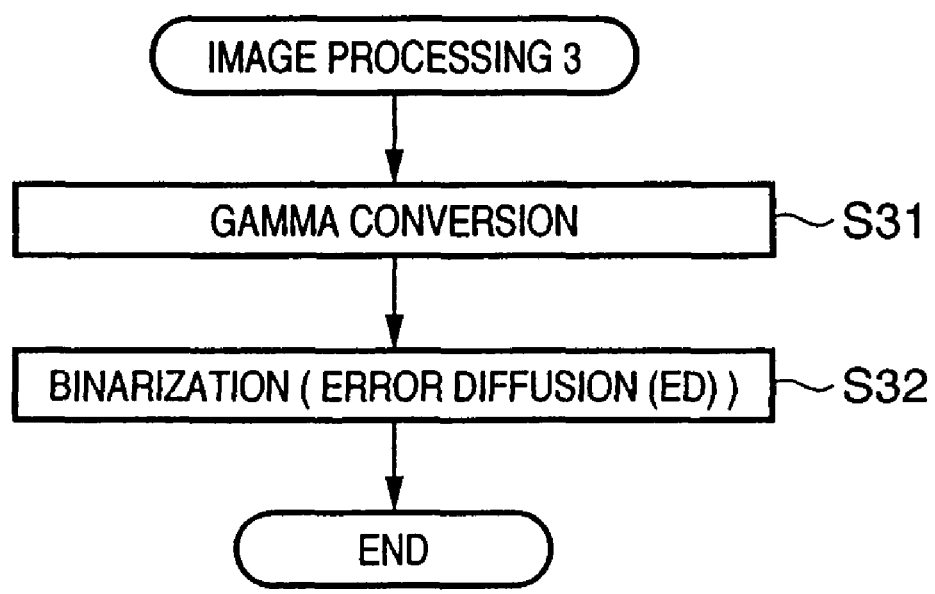
FIG. 17 is a flowchart showing "image processing 3" at step S5 in FIG. 13.

FIG. 17 is a flowchart showing the "image processing 3" at step S5 in FIG. 13.

First, at step S31, gamma conversion is performed on the 6 color image data, C, M, Y, L, LC and LM for density control. That is, γ correction is performed on the respective 8-bit C, M, Y, K, LC and LM data, subjected to the post color processing, by using the one-dimensional LUT 7012. Since the relation between the number of print dots per unit area and an output characteristic (reflection density or the like) is often nonlinear, a linear relation between the input level of the respective 8-bit C, M, Y, K, LC and LM data and the output characteristic at that time is ensured by the output γ correction. Note that in a case where individual difference of print head for printing by each color material is detected by detection means for detecting color shift in printed image, the color shift due to individual difference can be prevented by changing the data in the one-dimensional LUT 7012 for the output γ processing. For example, if the output characteristic of print head for printing by C color material is greater than an expected value, desired grayscale representation is attained by changing the input/output relation of the one-dimensional LUT 7012. By this arrangement, correction of individual difference of print heads in each apparatus can be realized.

Next, at step S32, binarization processing (error diffusion (ED)) is performed. The printer engine 3004 of the present embodiment is binary, or ternary or quaternary (binary in this case) printer engine to smoothly represent a photographic halftone image. The respective 8-bit C, M, Y, K, LC and LM image data are quantized by the error diffusion into respective 1-bit or respective 2-bit C, M, Y, K, LC and LM data. Since the quantization using error diffusion is well known, detailed description of the quantization will be omitted.

Figure 18:
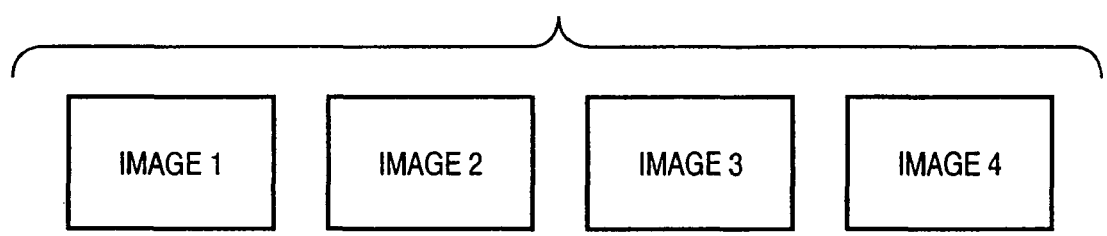
FIGS. 18 to 20 are schematic diagrams showing examples of printed images according to the embodiment.
Figure 19:
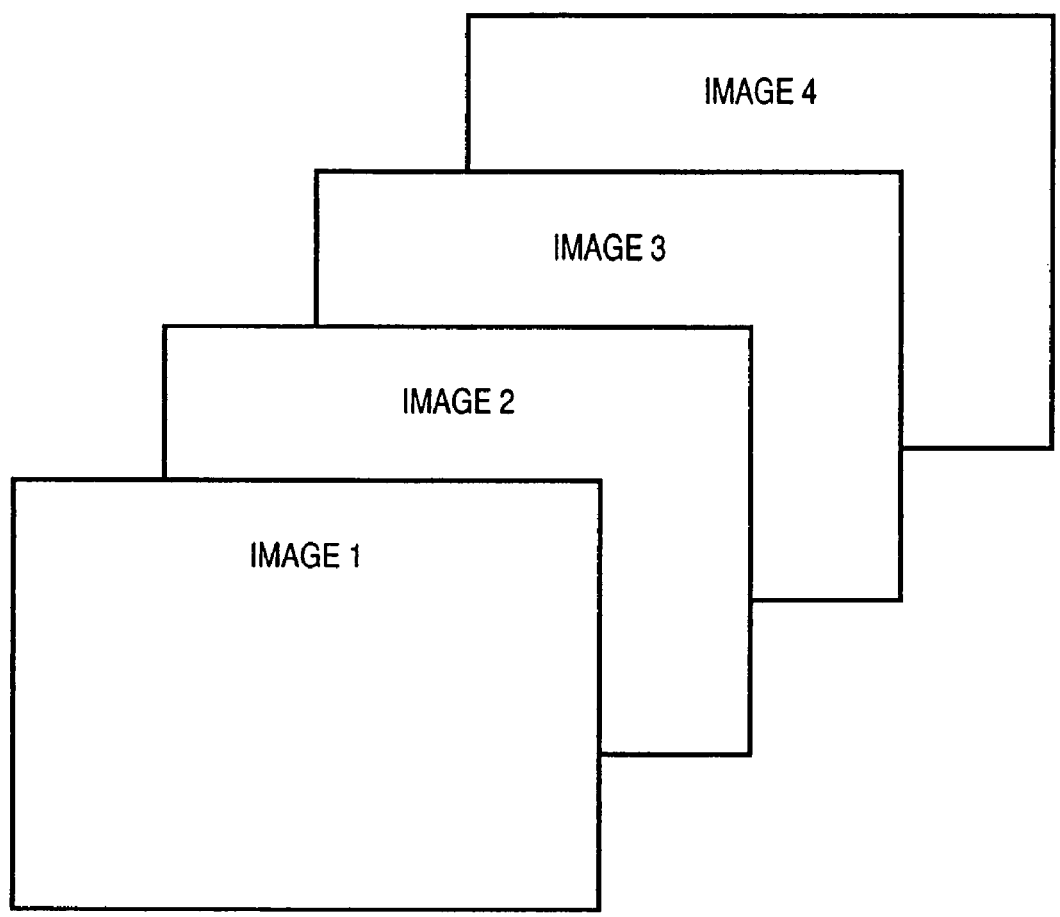
Figure 20:
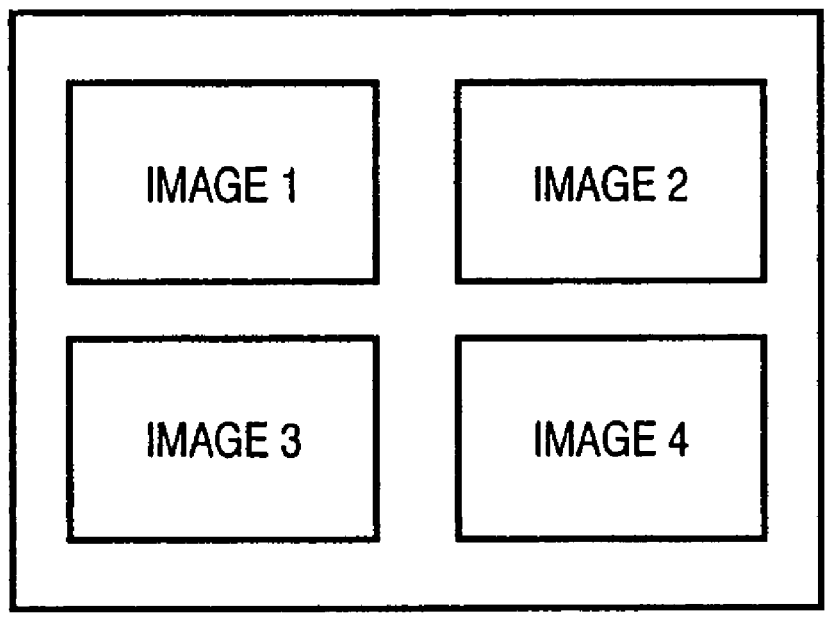

FIGS. 18 to 20 are schematic diagrams showing the relation between desired images 1 to 4 and printed images outputted by the printer engine 3004, in the above-described construction.

In FIG. 18, the "image 1" to "image 4" represents 4 images which the operator want to print-output. FIG. 18 shows an example of results of printing these 4 images by 1 print request operation (1 job) in the image correction mode set to "AT". Note that in the following description, the "image 1" and "image 3" are represented as the new format files, and the "image 2" and "image 4", as the old format files.

FIG. 19 shows an example of 4 images each obtained by printing 1 desired image on 1 print medium. Note that as the first "image 1" and the third "image 3" are represented as the new format files, they are subjected to optimum image correction. The second "image 2" and the fourth "image 4", represented as the old format files, are print-outputted without image correction.

FIG. 20 shows an example of these 4 images ("image 1" to "image 4") printed on 1 print medium. The "image 1" and "image 3" which are image data of new format file, are subjected to optimum image correction, while the "image 2" and "image 4", image data of old format file, are print-outputted on the same print sheet without image correction. Note that in this example, a layout where 4 images ("image 1" to "image 4") are printed on 1 print medium is employed, however, another layout such as 2 images, 8 images or 16 images may be employed.

In the present embodiment, the number of types of image data is 2, however, even if 3 or 4 types are employed in the future, the processing at steps S42 to S45 in FIG. 14 may be changed such that the 3D3 look-up table 7009 is generated in correspondence with the type of image data file.

Further, in the mode of printing directly from digital camera, it may be arranged such that the above-described unit for image-correction setting operation is provided on the digital camera side and the above X, Y and D setting statuses (FIGS. 11, 12) are notified to the photo-direct printer apparatus 1000. Further, to avoid complication of operation, the "AT" status may be automatically set. Further, as in the case of the above description, the mode set in the image correction unit of the liquid crystal display 1006 may be used upon camera-direct printing.

By such arrangement, in a case where image data from the digital camera is directly print-outputted, image correction can be performed in accordance with necessity by the above-described construction, and an optimum image output can be obtained.

Further, in the above embodiment, image correction is performed by the photo-direct printer apparatus 1000, however, the image correction may be performed in a print system constructed by connecting e.g. the PC 3010 with another image printing apparatus without the direct-print function as described in the present embodiment via an interface. In this case, as shown in FIG. 9, the PC 3010 selects the image correction settings as described in FIG. 12 by using GUI or the like, and the control construction shown in FIG. 11 and the software processing as described in the flowcharts of FIGS. 14 to 17 are introduced.

OTHER EMBODIMENT

As described above, the object of the present invention can be achieved by providing a storage medium holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

As described above, according to the present embodiment, items for settings of image correction are provided, and "automatic (AT)", "ON", "OFF" can be arbitrarily selected. Even if the setting of image correction is "automatic", image correction is not performed on image data of old format file, on the other hand, regarding image data of new format file, the setting of image correction is set to "ON" (to be corrected). By this arrangement, as optimum image correction can be performed in correspondence with the format of image file and setting, even if new and old format image files mixedly exist, images corresponding to the respective image files can be printed by one instruction operation. This improves operability upon image data printing.

Further, if the setting of image correction is "ON", image correction is performed on any image data of new and old format files, and further, if the setting of image correction is "OFF", image correction is not performed on any image data of new and old format files.

The present invention is not limited to the above embodiments and various changes and modifications can be made within the spirit and scope of the present invention. Therefore, to appraise the public of the scope of the present invention, the following claims are made.

What is claimed is:

1. A printing apparatus for receiving a plurality of items of image data from an image source and printing, comprising:
    a setting unit configured to set an instruction for correction into a print job;
    a determination unit configured to determine whether or not each item of image data to be printed in the print job has a file format corresponding to the instruction set by said setting unit, in a case that the instruction set by said setting unit is depended on a file format of image data;
    an image processing unit configured to process the image data in accordance with a determination result by said determination unit; and
    a printing unit configured to print all items of image data processed by said image processing unit in one print job.

2. An apparatus according to claim 1, wherein said image processing unit performs image processing on image data in which said determination unit determines to have the file format corresponding to the instruction, using image information of the image data in accordance with the instruction, and performs image processing on image data in which said determination unit determines to have no file format corresponding to the instruction, not in accordance with the instruction.

3. An apparatus according to claim 1, wherein
    said image processing unit includes a creation unit configured to create a parameter based on the image information, and
    said image processing unit processes the image data in which said determination unit determines to have the file format corresponding to the instruction, based on the parameter created by said creation unit.

4. An apparatus according to claim 1, wherein said image processing unit processes the image data in which said determination unit determines to have no file format corresponding to the instruction, based on a default parameter.

5. An apparatus according to claim 1, wherein said setting unit is capable of setting layout information for printing a plurality of items of image on a printing medium, and said apparatus further comprises a control unit configured to print all items of image data processed by said image processing unit in accordance with the layout information set by said setting unit, in one print job.

6. A control method of a printing apparatus for receiving a plurality of items of image data from an image source and printing, comprising the steps of:
    setting an instruction for correction into a print job;
    determining whether or not each item of image data to be printed in the print job has a file format corresponding to the instruction set in said setting step, in a case that the instruction set in said setting step is depended on a file format of image data;
    processing the image data in accordance with a determination result in said determining step; and printing all items of image data processed in said image processing step in one print job.

7. A method according to claim 6, wherein in said processing step, image processing on image data in which it is determined in said determining step to have the file format corresponding to the instruction, is performed using image information of the image data in accordance with the instruction, and image processing on image data in it is determined in said determining step to have no file format corresponding to the instruction, is performed not in accordance with the instruction.

8. A method according to claim 7, said processing step further comprising creating a parameter based on the image information, wherein the image data in which it is determined in said determination step to have the file format corresponding to the instruction, is processed based on the parameter created in said creating step.

9. A method according to claim 6, wherein in said processing step, the image data in which said determination unit determines to have no file format corresponding to the instruction, is processed based on a default parameter.

10. A method according to claim 6, wherein said setting step is capable of setting layout information for printing a plurality of items of image on a printing medium, the method further comprising a control step of printing all items of image data processed in said processing step in accordance with the layout information set in said setting step, in one print job.

11. A computer-readable storage medium for storing a program for causing a computer to implement a control method according to claim 6.

12. A printing system having an image source and a printing apparatus for printing an image based on a plurality of items of image data from the image source,
    said image source having:
        a setting unit configured to set an instruction for correction into a print job, and
    said printing apparatus having:
        a determination unit configured to determine whether or not each item of image data to be printed in the print job has a file format corresponding to the instruction set by said setting unit, in a case that the instruction set by said setting unit is depended on a file format of image data;
        an image processing unit configured to process the image data in accordance with a determination result by said determination unit; and
        a printing unit configured to print all items of image data processed by said image processing unit in one print job.

13. A system according to claim 12, wherein said image processing unit performs image processing on image data in which said determination unit determines to have the file format corresponding to the instruction, using image information of the image data in accordance with the instruction, and performs image processing on image data in which said determination unit determines to have no file format corresponding to the instruction, not in accordance with the instruction.

14. A system according to claim 12, wherein
    said image processing unit comprising a creation unit configured to create a parameter based on the image information, and
    wherein said image processing unit processes the image data in which said determination unit determines to have the file format corresponding to the instruction, based on the parameter created by said creation unit.

15. A system according to claim 10, wherein said image processing unit processes the image data in which said determination unit determines to have no file format corresponding to the instruction, based on a default parameter.

16. A system according to claim 10, wherein said setting unit is capable of setting layout information for printing a plurality of items of image on a printing medium, said system further comprising a control unit configured to print all items of image data processed by said image processing unit in accordance with the layout information set by said setting unit, in one print job.

17. A control method of a printing system having an image source and a printing apparatus for printing an image based on a plurality of items of image data from the image source, comprising the steps of:
    setting an instruction for correction into a print job at the image source;
    determining at the printing apparatus whether or not each item of image data to be printed in the print job has a file format corresponding to the instruction set in said setting step, in a case that the instruction set in said setting step is depended on a file format of image data;
    processing the image data in accordance with a determination result in said determining step at the printing apparatus; and
    printing all items of image data processed in said processing step in one print job at the printing apparatus.

18. A method according to claim 17, wherein in said processing step, image processing on image data in which it is determined in said determining step to have the file format corresponding to the instruction is processed, using image information of the image data in accordance with the instruction, and image processing on image data in which it is determined in said determining step to have no file format corresponding to the instruction is processed, not in accordance with the instruction.

19. A computer-readable storage medium for storing a program for causing a computer to implement a control method according to claim 17.

* * * * *